United States Patent
Gustafson et al.

(10) Patent No.: US 9,829,156 B2
(45) Date of Patent: Nov. 28, 2017

(54) INTEGRATED CRYOGENIC FLUID DELIVERY DEVICE WITH VAPORIZER HAVING A CONFORMAL GEOMETRY

(71) Applicant: Chart Inc., Garfield Heights, OH (US)

(72) Inventors: Erik Gustafson, Waleska, GA (US); Jeff Patelczyk, Cumming, GA (US); David Davis, Canton, GA (US); Michael Sable, Canton, GA (US); Luis Serentill, Lawrenceville, GA (US); Peter Murray, Cumming, GA (US)

(73) Assignee: Chart Inc., Garfield Heights, OH (US)

( * ) Notice: Subject to any disclaimer, the term of this patent is extended or adjusted under 35 U.S.C. 154(b) by 484 days.

(21) Appl. No.: 14/177,781

(22) Filed: Feb. 11, 2014

(65) Prior Publication Data

US 2014/0223924 A1   Aug. 14, 2014

Related U.S. Application Data

(60) Provisional application No. 61/763,258, filed on Feb. 11, 2013.

(51) Int. Cl.
*F17C 9/02* (2006.01)
*F02M 21/02* (2006.01)
(Continued)

(52) U.S. Cl.
CPC ........... *F17C 9/02* (2013.01); *F02M 21/0212* (2013.01); *F02M 21/0221* (2013.01); *F02M 21/06* (2013.01); *B60K 2015/03013* (2013.01); *B60K 2015/03315* (2013.01); *F17C 7/04* (2013.01); *F17C 13/123* (2013.01); *F17C 2201/056* (2013.01); *F17C 2205/0326* (2013.01);
(Continued)

(58) Field of Classification Search
CPC .. F17C 7/04; F17C 9/02; F17C 13/123; F17C 2227/039; F17C 2260/018; B60K 2015/03013; B60K 2015/03315; F02M 12/06; F02M 21/06
See application file for complete search history.

(56) References Cited

U.S. PATENT DOCUMENTS 1,901,446 A  *  3/1933  Heylandt ................. F17C 9/02
                                                            62/46.1
2,107,797 A  *  2/1938  Messer ..................... F17C 9/02
                                                            62/50.2
(Continued)

FOREIGN PATENT DOCUMENTS

CA          2653643         5/2009

OTHER PUBLICATIONS

Examination Report from European Patent Appl. No. 14154550.0 dated May 2, 2016.

*Primary Examiner* — David Teitelbaum
(74) *Attorney, Agent, or Firm* — Cook Alex Ltd.

(57) ABSTRACT

An integrated cryogenic fluid delivery system includes a cryogenic liquid tank having an interior, a wall and a geometry. The interior of the cryogenic liquid tank contains a supply of cryogenic liquid. A fuel pickup line is positioned within the interior of the tank and is in fluid communication with a vaporizer so that the vaporizer receives and vaporizes cryogenic liquid from the tank. The vaporizer is positioned outside of the tank and is secured to the wall. The vaporizer also has a shape that conforms with the geometry of the tank.

18 Claims, 2 Drawing Sheets

(51) Int. Cl.
*F02M 21/06* (2006.01)
*B60K 15/03* (2006.01)
*F17C 7/04* (2006.01)
*F17C 13/12* (2006.01)

(52) U.S. Cl.
CPC ............... *F17C 2205/0332* (2013.01); *F17C 2205/0335* (2013.01); *F17C 2205/0338* (2013.01); *F17C 2205/0391* (2013.01); *F17C 2205/0394* (2013.01); *F17C 2221/033* (2013.01); *F17C 2223/0161* (2013.01); *F17C 2223/033* (2013.01); *F17C 2223/047* (2013.01); *F17C 2225/0123* (2013.01); *F17C 2225/045* (2013.01); *F17C 2227/039* (2013.01); *F17C 2227/0316* (2013.01); *F17C 2227/0323* (2013.01); *F17C 2227/0393* (2013.01); *F17C 2250/043* (2013.01); *F17C 2250/0439* (2013.01); *F17C 2250/0447* (2013.01); *F17C 2250/0491* (2013.01); *F17C 2250/0495* (2013.01); *F17C 2260/018* (2013.01); *F17C 2265/065* (2013.01); *F17C 2265/066* (2013.01); *F17C 2270/0168* (2013.01); *Y02T 10/32* (2013.01)

(56) References Cited

U.S. PATENT DOCUMENTS

| | | | | |
|---|---|---|---|---|
| 2,217,583 | A * | 10/1940 | White | F17C 1/007 137/334 |
| 2,363,960 | A * | 11/1944 | Hansen | F17C 9/02 137/340 |
| 2,623,362 | A | 12/1952 | Zerbe | |
| 3,197,972 | A | 8/1965 | King | |
| 4,149,388 | A * | 4/1979 | Schneider | F17C 7/04 62/50.3 |
| 4,838,034 | A | 6/1989 | Leonard et al. | |
| 4,884,629 | A * | 12/1989 | Bronnert | F28D 7/06 165/159 |
| 6,279,326 | B1 * | 8/2001 | Boucher | F17C 9/02 62/48.1 |
| 7,607,898 | B2 * | 10/2009 | Noble | F02M 21/06 417/207 |

* cited by examiner

INTEGRATED CRYOGENIC FLUID DELIVERY DEVICE WITH VAPORIZER HAVING A CONFORMAL GEOMETRY

CLAIM OF PRIORITY

The application claims priority to U.S. Provisional Patent Application No. 61/763,258, filed Feb. 11, 2013, the contents of which are hereby incorporated by reference.

FIELD OF THE INVENTION

The present invention relates generally to cryogenic fluid delivery systems and, more specifically, to an integrated cryogenic fluid delivery system.

DETAILED DESCRIPTION OF EMBODIMENTS

The embodiment of the invention described below provides an integrated delivery system of liquefied natural gas (LNG) from a storage tank to a use device, such as a natural gas powered vehicle engine. It is to be understood that the invention may alternatively be used to deliver or dispense other types of cryogenic fluids.

With traditional LNG delivery systems, major components, such as the tank, vaporizer and valves may be separate sub-assemblies installed in various locations on the vehicle. In accordance with an embodiment of the present invention, these components are integrated into a single sub-assembly. By integrating all of the components into one sub-assembly, illustrated in phantom at 5 in FIG. 1, the effort for vehicle installation and the overall space claim for packaging may be reduced. Also, it may be possible to eliminate some components, such as excess flow devices, that would traditionally appear on systems featuring multiple sub-assemblies. Furthermore, heat from the vaporizer may be used to reduce ice build-up on tank plumbing components allowing superior performance in cold climates.

The invention is particularly suited for customers requiring easy assembly and minimal packaging space. Also, end user in cold weather climates may benefit.

Embodiments of the integrated tank concept for the system may include components with non-traditional geometry and/or combined functions. For example, a vaporizer (described below) designed to conform to the shape of the tank or multiple electrical functions combined into a single device allow for a reduction in packaging space. Also, a single mechanical device may be configured to perform multiple functions, such as shut-off and excess flow prevention.

Figure 1:
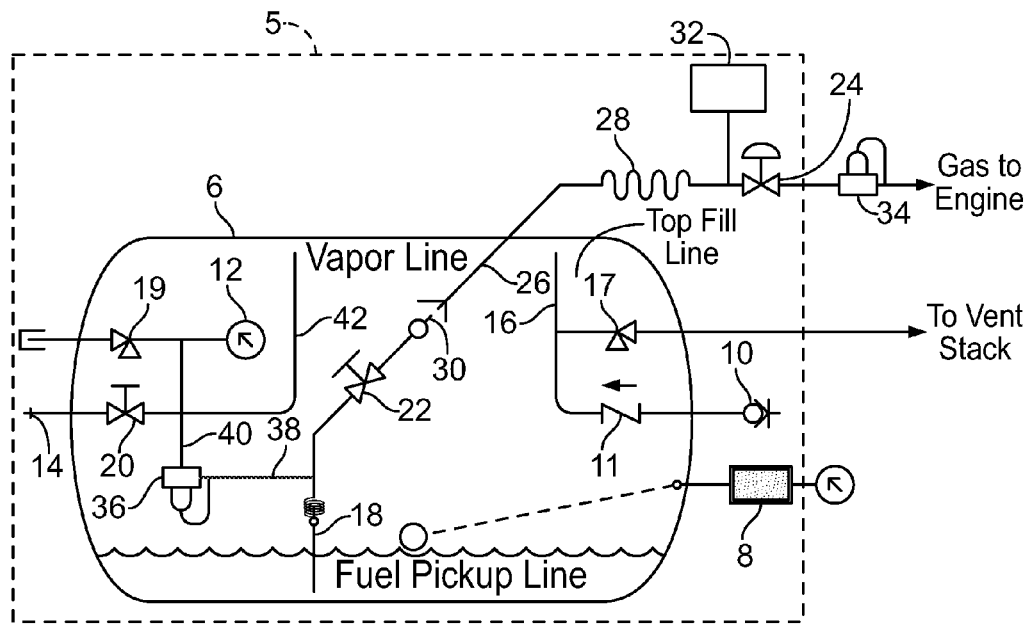
FIG. 1 is a schematic view of an embodiment of the integrated cryogenic fluid delivery system of the invention.

An embodiment of the system of the present invention is illustrated in FIG. 1. A cryogenic tank 6 contains a cryogenic product, such as LNG. As an example only, tank 6 may be cylindrical in shape. Pressure gauge 12 and level gauging system 8 indicate the status of the cryogenic product in the tank. A fill receptacle 10 is provided to fill the tank and a check valve 11 is provided to prevent back flow. More specifically, during filling, LNG enters receptacle 10, travels through the check valve 11 and up fill line 16 to exit into the head space of the tank 6.

Pressure relief devices, such as valves 17 and 19 are used to avoid over-pressurization of the tank 6. Vent valve 20 in conjunction with vent receptacle 14 allow the tank to be depressurized if needed for fueling or maintenance purposes.

A fuel pickup line 18 has a bottom opening in communication with the liquid in the bottom of the tank 6. In normal use of the system, that is, during dispensing or delivery of vaporized LNG, liquid valve 22 is open, while vent valve 20 is closed. To dispense LNG, or deliver it to the vehicle engine or other use device, automatic delivery valve 24 is opened. Due to the pressure in the head space of the tank, when valve 24 is opened, the LNG travels up line 18 and through line 26, including through valve 22. The LNG then travels through vaporizer 28 which vaporizes the LNG to a vapor phase, which then flows to the use device through valve 24.

One or more safeguards are in place in case of fuel line breakage or rupture. Excess flow valve 30 may be in place to directly sense a flow of LNG though line 26 that exceeds normal operational characteristics at which point the valve 30 closes. Alternatively or in conjunction with the aforementioned safeguard, low temperature switch 32 can sense the fuel temperature downstream of vaporizer 28 and may signal the closure of automatic valve 24 if necessary. This latter protection protects against failures such as fuel line breakage between the tank 6 and the use device and against failures of the vaporizer 28 itself including insufficient heat exchange fluid flow--both conditions resulting in cold fuel temperature downstream of the heat exchanger.

A delivery pressure regulator 34 may be used to limit pressure delivery of the gas to the use device if the maximum allowable pressure of the use device exceeds the pressure setting of the primary relief valve 17. The delivery pressure regulator 34 may be positioned either within or outside of the cylindrical shroud (62 of FIG. 3).

Depending upon the system pressure, vapor may be withdrawn from tank 6 through economizer regulator 36 which is connected to fuel pickup line 18 through line 38 and communicates with the head space of the tank through lines 40 and 42. When the vapor pressure in the tank head space exceeds a predetermined level, economizer regulator 36 opens so that vapor from the head space travels through lines 42, 40 and 38 to lines 18 and 26, and ultimately out of the tank through regulator 34.

While, as indicated above, manual valve 20 is typically closed, it may be opened during filling to reduce pressure or vent gas back to the fueling station. Manual valve 22 may be shut for maintenance purposes.

Figure 2:
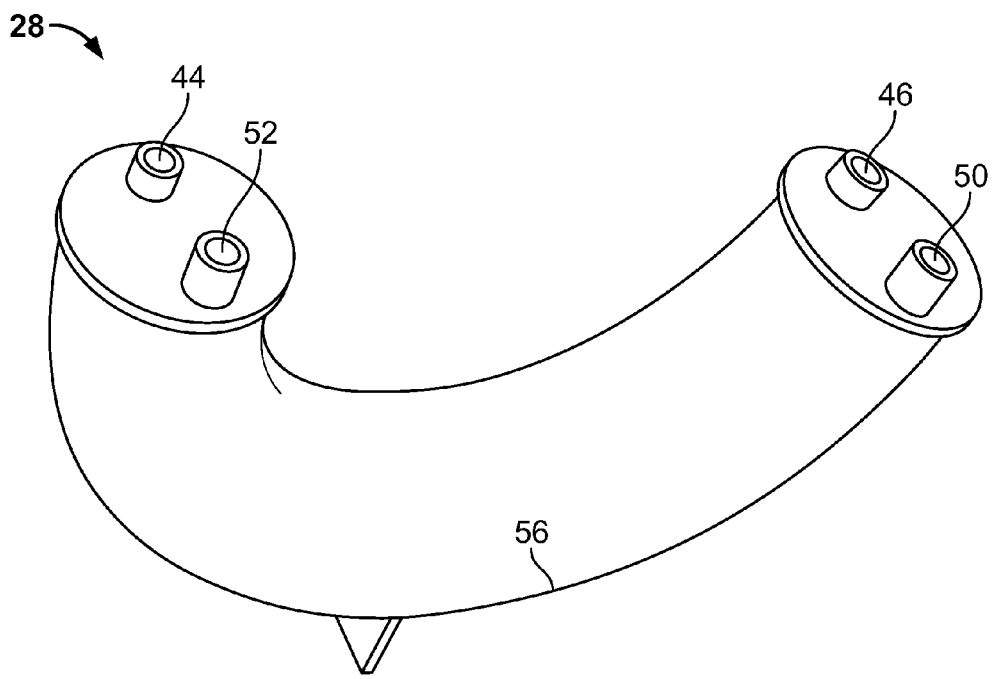
FIG. 2 is a perspective view of one embodiment of the vaporizer of the system of FIG. 1.
Figure 3:
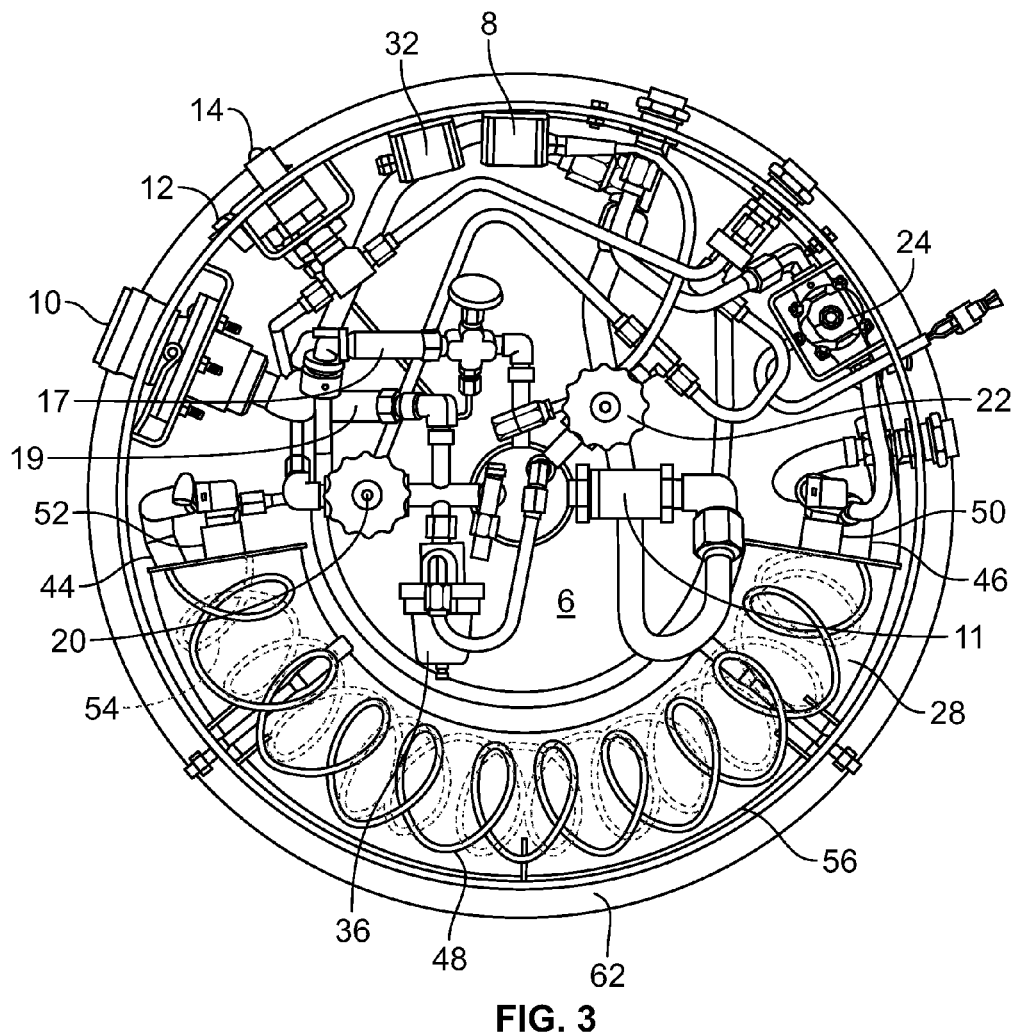
FIG. 3 is an end elevational view of a tank equipped with an embodiment of the system of FIG. 1.

An embodiment of the vaporizer 28 of FIG. 1 is indicated as a perspective view in FIG. 2. As illustrated in FIGS. 2 and 3, the vaporizer is provided with a conformal geometry. This device may be a shell and tube style heat exchanger utilizing warm engine coolant to vaporizer cold LNG. More specifically, the LNG from line 26 enters port 44 of the vaporizer and exits port 46 as vapor after traveling through an internal tube 48 (illustrated in FIG. 3) that connects ports 44 and 46. Warm engine coolant travels into the vaporizer 28 through port 50 and exits through port 52 after traveling through an internal tube 54 (illustrated in phantom in FIG. 3) that connects ports 50 and 52. One possible external geometry for the shell 56 of the vaporizer is semi-circular to conform with a cylindrical tank, as illustrated in FIG. 3. One possible geometry for the internal tubes 48 and 54 of the vaporizer includes a circular helix, again as illustrated in FIG. 3.

Figure 4:
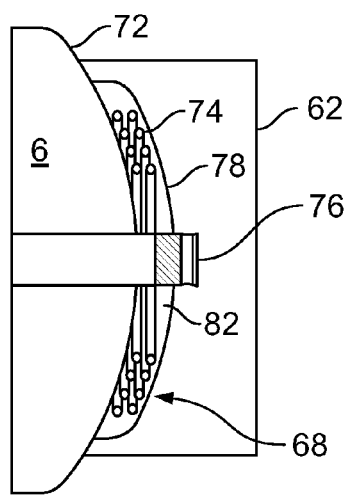
FIG. 4 is an cross section view of the front head shown with an additional possible embodiment of the vaporizer of the system of FIG. 1.

The components of FIGS. 1 and 2 installed on a tank, along with additional components, are illustrated in FIG. 3. As illustrated in FIG. 3, the components are efficiently organized and integrated into a single sub-assembly that fits within a cylindrical shroud 62 attached to an end wall or head of the tank to provide a compact package that takes up minimal space in an installation. The shroud, which projects from the end of the tank, as illustrated in FIG. 4, protects the components. More specifically, the shroud 62 creates a protected region for crash resistance.

An additional embodiment of vaporizer 28 (of FIG. 1) is indicated in general at 68 in FIG. 4. In this cross-sectional view, the embodiment of vaporizer is integral to front head 72 of tank 6. The tubes 74 which carry and vaporize LNG are wound around the longitudinal axis of support 76 of tank 6. A second head 78 fits over the tubes and forms a space 82 in which the heat exchange fluid may travel. Plumbing components shown in FIG. 3 are mounted in a similar fashion to the head of the tank and are likewise protected by shroud 62.

While the preferred embodiments of the invention have been shown and described, it will be apparent to those skilled in the art that changes and modifications may be made therein without departing from the spirit of the invention, the scope of which is defined by the following claims.

What is claimed is:

1. An integrated cryogenic fluid delivery system comprising:
   a) a tank having a cylindrical wall, a first head and a second head that define a tank interior;
   b) a cylindrical shroud extending from the first head so that a cylindrical shroud interior is defined;
   c) a fuel pickup line positioned within the tank interior;
   d) a vaporizer in fluid communication with the fuel pickup line;
   e) said vaporizer positioned outside of the tank adjacent to the first head of the tank and entirely within the cylindrical shroud interior, said vaporizer including:
      i. an arcuate semi-circular shell having an inner wall portion and an outer wall portion that cooperate to define a shell interior, the outer wall portion of the arcuate semi-circular shell having a first curvature that matches a second curvature of the cylindrical shroud and the cylindrical wall of the tank and wherein the outer wall portion of the arcuate semi-circular shell is positioned adjacent to and opposing an interior surface of the cylindrical shroud and the inner wall portion of the arcuate semi-circular shell faces an axis of the cylindrical shroud;
      ii. a cryogenic fluid inlet port and a cryogenic fluid outlet port formed in the arcuate semi-circular shell;
      iii. a cryogenic fluid internal tube featuring a circular helix geometry positioned within the shell interior and connected between the cryogenic fluid inlet port and the cryogenic fluid outlet port;
      iv. a warming fluid inlet port and a warming fluid outlet port formed in the arcuate semi-circular shell.

2. The cryogenic fluid delivery system of claim 1 further comprising:
   f) a delivery valve in fluid communication with the vaporizer;
   g) a pressure relief valve in fluid communication with the tank interior;
   h) a regulator in communication with the fuel pickup line;
and wherein the delivery valve, the pressure relief valve and the regulator are located within the cylindrical shroud interior so that the vaporizer is adapted to provide heat to reduce ice build-up on the delivery valve, the pressure relief valve and the regulator.

3. The cryogenic fluid delivery system of claim 2 wherein the regulator is an economizer regulator and further comprising a delivery pressure regulator positioned within the cylindrical shroud interior.

4. The cryogenic fluid delivery system of claim 2 wherein the delivery valve, the pressure relief valve and the regulator are positioned within a cylindrical area having a cylindrical area radius of curvature defined by an arcuate portion radius of curvature of an arcuate portion of the inner wall portion that is closest to the axis of the cylindrical shroud.

5. The cryogenic fluid delivery system of claim 2 wherein the delivery valve, the pressure relief valve and the regulator are positioned so as to oppose the inner wall portion.

6. The cryogenic fluid delivery system of claim 1 wherein the vaporizer is a shell and tube heat exchanger.

7. The cryogenic fluid delivery system of claim 1 further comprising a warming fluid internal tube featuring a circular helix geometry positioned within the shell interior in heat exchange relationship with the cryogenic fluid internal tube, said warming fluid internal tube connected between the warming fluid inlet port and the warming fluid outlet port.

8. The cryogenic fluid delivery system of claim 1 wherein the vaporizer is mounted directly to an interior surface of the cylindrical shroud.

9. The cryogenic fluid delivery system of claim 1 wherein the arcuate semi-circular shell has a round cross section so that the arcuate semi-circular shell is semi-toroidal in shape.

10. An integrated cryogenic fluid delivery system comprising:
   a) a tank having a cylindrical wall a first head and a second head that define a tank interior containing a supply of cryogenic liquid with a pressurized headspace above;
   b) a cylindrical shroud extending from the first head so that a cylindrical shroud interior is defined;
   c) a fuel pickup line positioned within the cryogenic liquid;
   d) a vaporizer in fluid communication with the fuel pickup line so that cryogenic liquid from the tank is driven to the vaporizer by the pressurized headspace of the tank interior and vaporized;
   e) said vaporizer positioned outside of the tank adjacent to the first head of the tank and entirely within the cylindrical shroud interior, said vaporizer including:
      i. an arcuate semi-circular shell having an inner wall portion and an outer wall portion that cooperate to define a shell interior, the outer wall portion of the arcuate semi-circular shell having a first curvature that matches a second curvature of the cylindrical shroud and the cylindrical wall of the tank and wherein the outer wall portion of the arcuate semi-circular shell is positioned adjacent to and opposing an interior surface of the cylindrical shroud and the inner wall portion of the arcuate semi-circular shell faces an axis of the cylindrical shroud;
      ii. a cryogenic fluid inlet port and a cryogenic fluid outlet port formed in the arcuate semi-circular shell;
      iii. a cryogenic fluid internal tube featuring a circular helix geometry positioned within the shell interior and connected between the cryogenic fluid inlet port and the cryogenic fluid outlet port;

iv. a warming fluid inlet port and a warming fluid outlet port formed in the arcuate semi-circular shell.

11. The cryogenic fluid delivery system of claim 10 further comprising:
   f) a delivery valve in fluid communication with the vaporizer;
   g) a pressure relief valve in fluid communication with the tank interior;
   h) a regulator in communication with the fuel pickup line; and wherein the delivery valve, the pressure relief valve and the regulator are located within the cylindrical shroud interior so that the vaporizer is adapted to provide heat to reduce ice build-up on the delivery valve, the pressure relief valve and the regulator.

12. The cryogenic fluid delivery system of claim 11 wherein the regulator is an economizer regulator and further comprising a delivery pressure regulator positioned within the cylindrical shroud interior.

13. The cryogenic fluid delivery system of claim 11 wherein the delivery valve, the pressure relief valve and the regulator are positioned within a cylindrical area having a cylindrical area radius of curvature defined by an arcuate portion radius of curvature of an arcuate portion of the inner wall portion that is closest to the axis of the cylindrical shroud.

14. The cryogenic fluid delivery system of claim 11 wherein the delivery valve, the pressure relief valve and the regulator are positioned so as to oppose the inner wall portion.

15. The cryogenic fluid delivery system of claim 10 further comprising an engine having a coolant and wherein the warming fluid inlet port and the warming fluid outlet port formed in the arcuate semi-circular shell are connected to the engine so that warm engine coolant travels into the vaporizer through the warming fluid inlet port and exits the vaporizer through the warming fluid outlet port.

16. The cryogenic fluid delivery system of claim 10 wherein the vaporizer is a shell and tube heat exchanger.

17. The cryogenic fluid delivery system of claim 10 further comprising a warming fluid internal tube featuring a circular helix geometry positioned within the shell interior in heat exchange relationship with the cryogenic fluid internal tube, said warming fluid internal tube connected between the warming fluid inlet port and the warming fluid outlet port.

18. The cryogenic fluid delivery system of claim 10 wherein the arcuate semi-circular shell has a round cross section so that the arcuate semi-circular shell is semi-toroidal in shape.

* * * * *